US012263408B2

(12) United States Patent
Walker et al.

(10) Patent No.: US 12,263,408 B2
(45) Date of Patent: Apr. 1, 2025

(54) CONTEXTUAL SCENE ENHANCEMENT

(71) Applicants: SONY INTERACTIVE ENTERTAINMENT LLC, San Mateo, CA (US); SONY INTERACTIVE ENTERTAINMENT INC., Tokyo (JP)

(72) Inventors: Victoria Walker, San Mateo, CA (US); Olga Rudi, San Mateo, CA (US); Aslanta Chen, San Mateo, CA (US); Phoenix Nitta-Hill, San Mateo, CA (US); Charles McCoy, San Mateo, CA (US); Steven Osman, San Mateo, CA (US)

(73) Assignees: SONY INTERACTIVE ENTERTAINMENT LLC, San Mateo, CA (US); SONY INTERACTIVE ENTERTAINMENT INC., Tokyo (JP)

( * ) Notice: Subject to any disclaimer, the term of this patent is extended or adjusted under 35 U.S.C. 154(b) by 76 days.

(21) Appl. No.: 17/870,546

(22) Filed: Jul. 21, 2022

(65) Prior Publication Data
US 2024/0024783 A1 Jan. 25, 2024

(51) Int. Cl.
A63F 13/69 (2014.01)
G10L 25/63 (2013.01)

(52) U.S. Cl.
CPC ............ A63F 13/69 (2014.09); G10L 25/63 (2013.01)

(58) Field of Classification Search
CPC ........ A63F 13/69; A63F 13/35; A63F 13/335; A63F 13/87; G10L 15/26; G10L 25/63
See application file for complete search history.

(56) References Cited

U.S. PATENT DOCUMENTS 8,566,075 B1 * 10/2013 Bruner ............... H04N 21/6582
704/2
9,308,445 B1 4/2016 Merzenich et al.
(Continued)

FOREIGN PATENT DOCUMENTS

WO WO 2024/019819 1/2024
WO WO 2024/019820 1/2024

OTHER PUBLICATIONS

PCT Application No. PCT/US2023/023875, International Search Report and Written Opinion dated Aug. 11, 2023.
(Continued)

Primary Examiner — Wilson W Tsui
(74) Attorney, Agent, or Firm — Kilpatrick Townsend & Stockton LLP

(57) ABSTRACT

Certain aspects of the present disclosure include systems and techniques for generating content that indicates a sensation associated with audio. One example method generally includes monitoring audio to be played during display of an associated portion of an interactive content stream provided over a communication network to at least one viewing device during an interactive session, and analyzing, via a machine learning component, the audio to determine a sensation associated with at least a portion of the audio. The method may also include determining an effect indicating the sensation, wherein the effect is associated with one or more output devices associated with the at least one viewing device, and outputting an indication of the effect to the associated output devices, wherein the effect is configured to be output along with the audio in real-time with the display of the associated portion of the interactive content stream.

19 Claims, 8 Drawing Sheets

(56) References Cited

U.S. PATENT DOCUMENTS

| | | | |
|---|---|---|---|
| 9,950,251 | B1 | 4/2018 | Lewis et al. |
| 10,299,008 | B1* | 5/2019 | Catalano ................. G06F 18/22 |
| 11,829,586 | B2* | 11/2023 | Fong ..................... G06F 3/0484 |
| 2006/0281403 | A1 | 12/2006 | Richards et al. |
| 2008/0206732 | A1 | 8/2008 | Zalewski |
| 2009/0011831 | A1 | 1/2009 | Yamada |
| 2011/0281639 | A1 | 11/2011 | Porat et al. |
| 2013/0045804 | A1 | 2/2013 | Ruke |
| 2013/0121481 | A1* | 5/2013 | Mikan ................... H04L 51/216 379/88.14 |
| 2014/0184550 | A1 | 7/2014 | Hennessey et al. |
| 2015/0070150 | A1* | 3/2015 | Levesque ........... H04N 21/4884 340/407.1 |
| 2016/0077547 | A1 | 3/2016 | Aimone et al. |
| 2016/0370860 | A1 | 12/2016 | Bychkov et al. |
| 2017/0064414 | A1 | 3/2017 | Mickelsen et al. |
| 2017/0085696 | A1* | 3/2017 | Abkairov ................ G06F 3/017 |
| 2017/0188119 | A1 | 6/2017 | Lacroix |
| 2017/0304707 | A1 | 10/2017 | Morton |
| 2018/0293996 | A1* | 10/2018 | Mortis .................... G10L 15/30 |
| 2018/0352303 | A1* | 12/2018 | Siddique ............. H04L 65/1069 |
| 2018/0359349 | A1* | 12/2018 | Graylin ............... G10L 15/1815 |
| 2019/0087006 | A1 | 3/2019 | Rihn et al. |
| 2019/0370036 | A1* | 12/2019 | Desai ..................... G06F 3/0482 |
| 2023/0071358 | A1 | 3/2023 | van Welzen |
| 2023/0237242 | A1* | 7/2023 | Seroussi ............... G06F 40/232 715/200 |
| 2024/0029437 | A1 | 1/2024 | Bartolome et al. |

OTHER PUBLICATIONS

PCT Application No. PCT/US2023/023974, International Search Report and Written Opinion dated Aug. 11, 2023.

U.S. Appl. No. 17/870,588, Non-Final Office Action dated Feb. 2, 2024.

* cited by examiner

CONTEXTUAL SCENE ENHANCEMENT

BACKGROUND OF THE INVENTION

1. Field of the Disclosure

The present disclosure generally relates to content generation. For example, aspects of the present disclosure include systems and techniques for generating content that indicates a sensation associated with audio.

2. Description of the Related Art

Interactive content— such as video games—has seen many changes over the years. As computing power has increased, developers of interactive content and video games have taken advantage of the increased computing power to provide a more immersive, complex, and nuanced user experience within one or more rendered virtual environments. Great visuals, immersive audio, and integrated haptics may combine to create the immersive experiences, ambiances, and narratives in games or other interactive content, as well as evoke certain emotional responses. Audio, for example, may be used to communicate not only speech to tell a story, but also a sensation associated with the speech or an environment. The audio associated with interactive content is therefore an integral part of the experience and used to immerse viewers and tell a compelling story. As used herein, sensation may refer to an intended nuance in meaning that may be unspoken within a narrative or scene, including emotion, subtext, ambiance, rising and release in tension, and other intended impacts on the user.

Certain people (e.g., having hearing impairment, neurodivergence, or with language barriers) may not be able to fully experience certain intended sensations within a virtual reality (VR) environment, particularly where in-game events may be occurring at a fast pace, other players may be cross-talking, or other virtual or real-world distractions may prevent full concentration and comprehension. Referring to the example above, while a transcript of audio displayed as subtitles may convey the speech spoken in a given scene, there are other sensations associated with the original scene that may not be conveyed by the subtitles alone. For instance, a sentiment such as anger or sadness that may be apparent in the tone and context of speech, background music and score, character facial expressions, and body language, etc., but may not be conveyed by a text transcript that is separated even a little bit in time from real-time events. As another example, background sounds that may portray a specific mood, such as a gloomy environment, may not be portrayed in subtitles alone.

There is, therefore, a need in the art for improved systems and methods for contextual scene enhancement.

SUMMARY OF THE CLAIMED INVENTION

Certain aspects of the present disclosure are directed towards a method for content display. The method generally includes: monitoring audio to be played during display of an associated portion of an interactive content stream provided over a communication network to at least one viewing device during an interactive session; analyzing, via a machine learning component, the audio to determine a sensation associated with at least a portion of the audio; determining an effect indicating the sensation, wherein the effect is associated with one or more output devices associated with the at least one viewing device; and outputting an indication of the effect to the associated output devices, wherein the effect is configured to be output along with the audio in real-time with the display of the associated portion of the interactive content stream.

Certain aspects of the present disclosure are directed towards an apparatus for content display. The apparatus generally includes a memory and one or more processors coupled to the memory, the one or more processors being configured to: monitor audio to be played during display of an associated portion of an interactive content stream provided over a communication network to at least one viewing device during an interactive session; analyze, via a machine learning component, the audio to determine a sensation associated with at least a portion of the audio; determine an effect indicating the sensation, wherein the effect is associated with one or more output devices associated with the at least one viewing device; and output an indication of the effect to the associated output devices, wherein the effect is configured to be output along with the audio in real-time with the display of the associated portion of the interactive content stream.

Certain aspects of the present disclosure are directed towards a non-transitory computer-readable medium having instructions stored thereon, which when executed by one or more processors, cause the one or more processors to: monitor audio to be played during display of an associated portion of an interactive content stream provided over a communication network to at least one viewing device during an interactive session; analyze, via a machine learning component, the audio to determine a sensation associated with at least a portion of the audio; determine an effect indicating the sensation, wherein the effect is associated with one or more output devices associated with the at least one viewing device; and output an indication of the effect to the associated output devices, wherein the effect is configured to be output along with the audio in real-time with the display of the associated portion of the interactive content stream.

DETAILED DESCRIPTION

Certain aspects of the present disclosure are directed towards a content generation system that analyzes audio to determine a sensation associated with the audio, determines an effect to indicate such a sensation, and outputs the effect to a user device to implement contextual scene enhancements. The effect indicating the sensation may be a visual effect that is displayed along with the audio, such as a symbol, color, font, or image. In some aspects, the effect may be a haptic effect that may output to a haptic device, such as a haptic vest or haptics integrated in a headset or controller, as described in more detail herein.

In some aspects, the content generation system may be implemented using a machine learning component that is trained to analyze audio and indicate a sensation associated with the audio. For instance, the machine learning component may be trained to detect anger or sadness in speech and provide an indication of the sensation to be used for generating the effect to be displayed or outputted to a haptic device.

Figure 1:
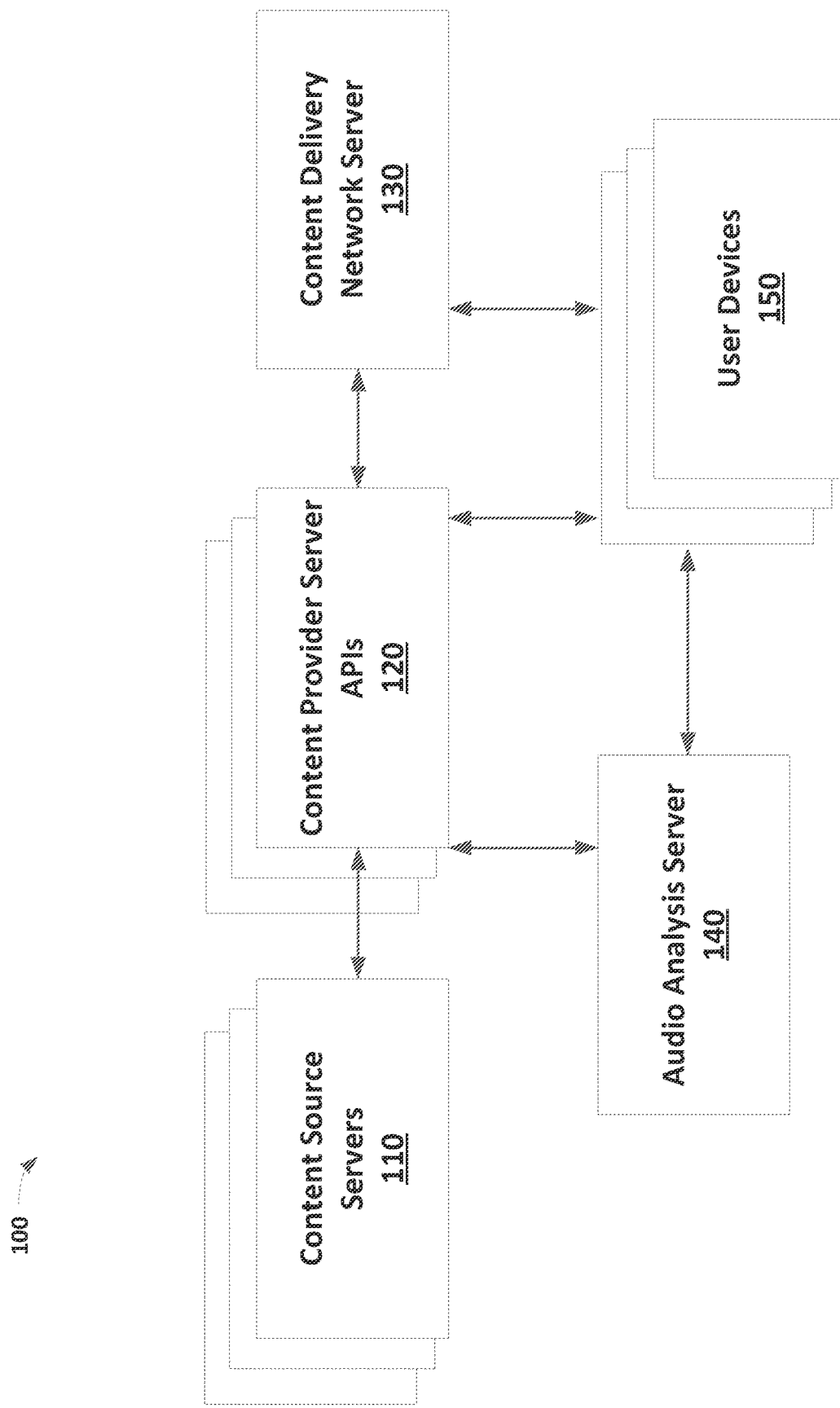
FIG. 1 illustrates a network environment in which a system for enhancing content display may be implemented.

FIG. 1 illustrates an exemplary network environment 100 in which a system for providing a sensation effect may be implemented. The network environment 100 may include one or more content source servers 110 that provide digital content (e.g., games, other applications and services) for distribution, one or more content provider server application program interfaces (APIs) 120, content delivery network server 130, an audio analysis server 140, and one or more user devices 150. The servers described herein may include any type of server as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Content source servers 110 may maintain and provide a variety of digital content available for distribution. The content source servers 110 may be associated with any content provider that makes its content available for access over a communication network. Such content may include not only digital video and games, but also other types of digital applications and services. Such applications and services may include any variety of different digital content and functionalities that may be provided to user devices 150.

The content from content source server 110 may be provided through a content provider server API 120, which allows various types of content sources server 110 to communicate with other servers in the network environment 100 (e.g., user devices 150). The content provider server API 120 may be specific to the particular language, operating system, protocols, etc. of the content source server 110 providing the content, as well as the user devices 150. In a network environment 100 that includes multiple different types of content source servers 110, there may likewise be a corresponding number of content provider server APIs 120 that allow for various formatting, conversion, and other cross-device and cross-platform communication processes for providing content and other services to different user devices 150, which may use different operating systems, protocols, etc., to process such content. As such, applications and services in different formats may be made available so as to be compatible with a variety of different user device 150.

The content provider server API 120 may further facilitate access of each of the user devices 150 to the content hosted or services provided by the content source servers 110, either directly or via content delivery network server 130. Additional information, such as metadata, about the accessed content or service can also be provided by the content provider server API 120 to the user device 150. As described below, the additional information (i.e. metadata) can be usable to provide details about the content or service being provided to the user device 150. In some embodiments, the services provided from the content source servers 110 to the user device 150 via the content provider server API 120 may include supporting services that are associated with other content or services, such as chat services, ratings, and profiles that are associated with a particular game, team, community, etc. In such cases, the content source servers 110 may also communicate with each other via the content provider server API 120.

The content delivery network server 130 may include a server that provides resources, files, etc., related to the content from content source servers 110, including various content and service configurations, to user devices 150. The content delivery network server 130 can also be called upon by the user devices 150 that request to access specific content or services. Content delivery network server 130 may include universe management servers, game servers, streaming media servers, servers hosting downloadable content, and other content delivery servers known in the art.

The audio analysis server 140 may include any data server known in the art that is capable of analyzing audio to determine an intended sensation associated with the audio and generate an output effect indicating the intended sensation. In an exemplary implementation, audio analysis server 140 monitors audiovisuals of an incoming stream portion before the stream portion is played (e.g., from a buffer) during an interactive session established over a communication network with at least one viewing device (e.g., user devices 150). The audio analysis server 140 may analyze the audio to determine an intended sensation associated with at least a portion of the audio. The audio may be analyzed using one or more machine learning models (e.g., associated with the content title, content genre, content developer, user parameter). Such machine learning models may track patterns of in-game indicators associated with certain sensations. For example, a certain content title may be from the horror genre, which the audio analysis server 140 may identify based on certain audiovisual cues indicative of inter alia jump scares from timing/pacing, monsters or creatures, and cues from the players themselves (e.g., screams, gasps, biometrics indicating racing heartbeat). The audio analysis server 140 may therefore assess new content titles to determine which machine learning models may be applicable for contextual scene enhancement.

Once the applicable machine learning model(s) are identified, the audio analysis server 140 may then use such model(s) to determine what sensation is intended in a particular upcoming scene, determine which type of effect or enhancement is associated with the intended sensation, and generate instructions regarding the determined effect to associated output devices. The effect may therefore be output along with the associated audio in real-time (or near real-time) with the visual display of the portion of the interactive content stream.

The user device 150 may include a plurality of different types of computing devices. The user device 150 may be a server that provides an internal service (e.g., to other servers) in network environment 100. In such cases, user device 150 may correspond to one of the content servers 110 described herein. Alternatively, the user device 150 may be a client device that may include any number of different gaming consoles, mobile devices, laptops, and desktops. Such user devices 150 may also be configured to access data from other storage media, such as, but not limited to memory cards or disk drives as may be appropriate in the case of downloaded services. Such user devices 150 may include standard hardware computing components such as, but not limited to network and media interfaces, non-transitory computer-readable storage (memory), and processors for executing instructions that may be stored in memory. These user devices 150 may also run using a variety of different operating systems (e.g., iOS, Android), applications or computing languages (e.g., C++, JavaScript). Each user device 150 may be associated with participants or other types of spectators of a collection of digital content streams.

Figure 2:
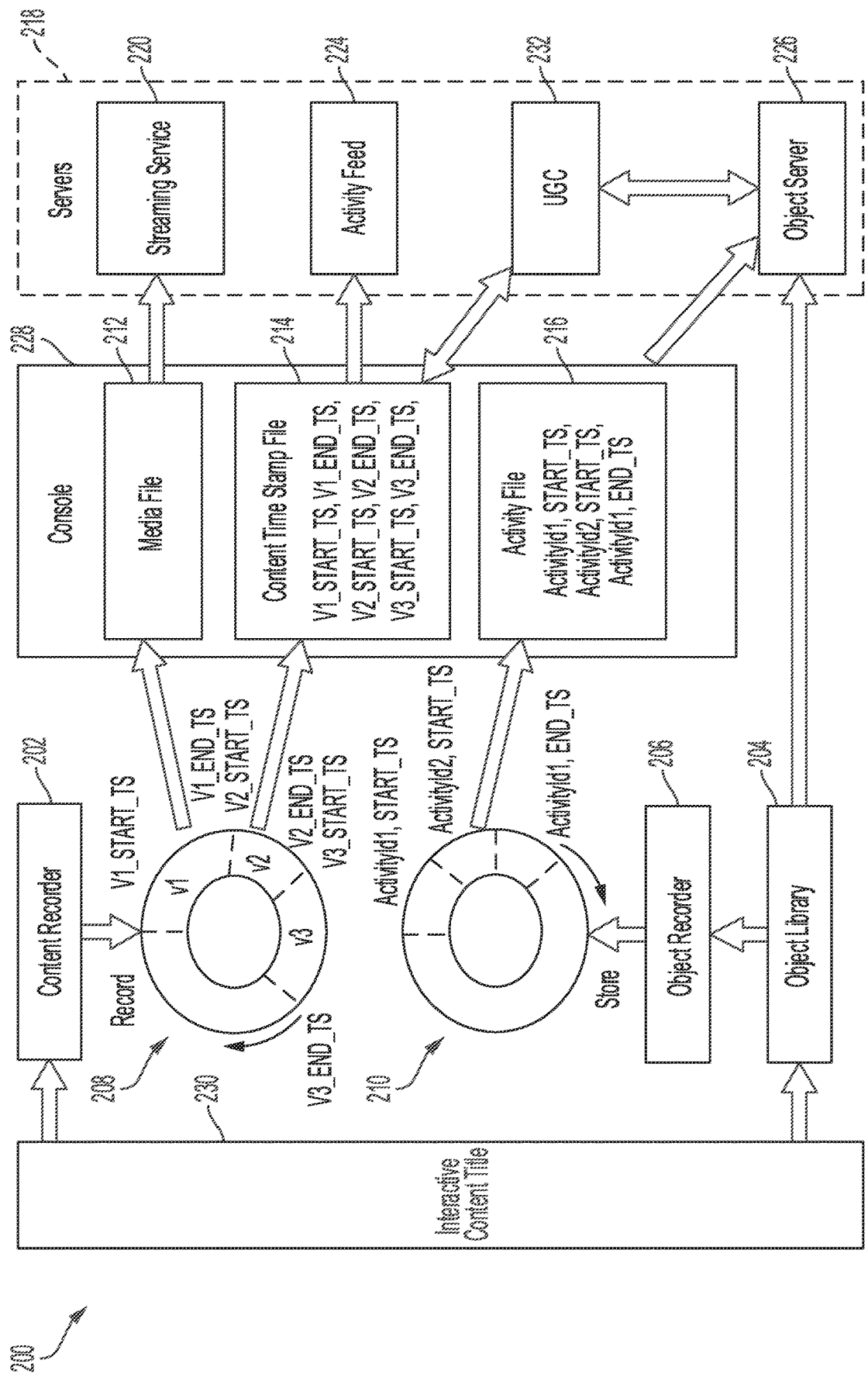
FIG. 2 illustrates an exemplary uniform data system (UDS) that may be used to provide data to a system for content display.

FIG. 2 illustrates an exemplary universal or uniform data system (UDS) 200 that may be used to provide data to a system for sensation effect generation. Based on data provided by UDS, the audio analysis server 140 can be made aware of what in-game objects, entities, activities, and events that users have engaged with, and thus support and coordinate sensation analysis and effects generation. Each user interaction may be associated with the metadata for the type of in-game interaction, location within the in-game environment, and point in time within an in-game timeline, as well as other players, objects, entities, etc., involved. Thus, metadata can be tracked for any of the variety of user interactions that can occur in during a game session, including associated activities, entities, settings, outcomes, actions, effects, locations, and character stats. Such data may further be aggregated, applied to data models, and subject to analytics. Such a UDS data model may be used to assign contextual information to each portion of information in a unified way across games.

As illustrated in FIG. 2, an exemplary console 228 (e.g., a user device 150) and exemplary servers 218 (e.g., streaming server 220, an activity feed server 224, a user-generated content (UGC) server 232, and an object server 226) are shown. In one example, the console 228 may be implemented on a platform server, a cloud server, or on any of the servers 218. In an exemplary example, a content recorder 202 may be implemented on a platform server, a cloud server, or on any of the servers 218. Such content recorder 202 receives and records content (e.g., media) from an interactive content title 230 onto a content ring-buffer 208. Such ring-buffer 208 may store multiple content segments (e.g., v1, v2 and v3), start times for each segment (e.g., V1_START_TS, V2_START_TS, V3_START_TS), and end times for each segment (e.g., V1_END_TS, V2_END_TS, V3_END_TS). Such segments may be stored as a media file 212 (e.g., MP4, WebM, etc.) by the console 228. Such media file 212 may be uploaded to the streaming server 220 for storage and subsequent streaming or use, though the media file 212 may be stored on any server, a cloud server, any console 228, or any user device 150. Such start times and end times for each segment may be stored as a content time stamp file 214 by the console 228. Such content time stamp file 214 may also include a streaming ID, which matches a streaming ID of the media file 212, thereby associating the content time stamp file 214 to the media file 212. Such content time stamp file 214 may be uploaded and stored to the activity feed server 224 and/or the UGC server 232, though the content time stamp file 214 may be stored on any server, a cloud server, any console 228, or any user device 150.

Concurrent to the content recorder 202 receiving and recording content from the interactive content title 230, an object library 204 receives data from the interactive content title 230, and an object recorder 206 tracks the data to determine when an object beings and ends. The object library 204 and the object recorder 206 may be implemented on a platform server, a cloud server, or on any of the servers 218. When the object recorder 206 detects an object beginning, the object recorder 206 receives object data (e.g., if the object were an activity, user interaction with the activity, activity ID, activity start times, activity end times, activity results, activity types, etc.) from the object library 204 and records the activity data onto an object ring-buffer 210 (e.g., ActivityID1, START_TS; ActivityID2, START_TS; ActivityID3, START_TS). Such activity data recorded onto the object ring-buffer 210 may be stored in the object file 216. Such object file 216 may also include activity start times, activity end times, an activity ID, activity results, activity types (e.g., competitive match, quest, task, etc.), user or peer data related to the activity. For example, an object file 216 may store data regarding an item used during the activity. Such object file 216 may be stored on the object server 226, though the object file 216 may be stored on any server, a cloud server, any console 228, or any user device 150.

Such object data (e.g., the object file 216) may be associated with the content data (e.g., the media file 212 and/or the content time stamp file 214). In one example, the UGC server 232 stores and associates the content time stamp file 214 with the object file 216 based on a match between the streaming ID of the content time stamp file 214 and a corresponding activity ID of the object file 216. In another example, the object server 226 may store the object file 216 and may receive a query from the UGC server 232 for an object file 216. Such query may be executed by searching for an activity ID of an object file 216 that matches a streaming ID of a content time stamp file 214 transmitted with the query. In yet another example, a query of stored content time stamp files 214 may be executed by matching a start time and end time of a content time stamp file 214 with a start time and end time of a corresponding object file 216 transmitted with the query. Such object file 216 may also be associated with the matched content time stamp file 214 by the UGC server 232, though the association may be performed by any server, a cloud server, any console 228, or any user device 150. In another example, an object file 216 and a content time stamp file 214 may be associated by the console 228 during creation of each file 216, 214.

In exemplary embodiments, the media files 212 and activity files 216 may provide information to audio analysis server 140 regarding current session conditions. Audio analysis server 140 may therefore use such media files 212 and activity files 216 to determine whether the current session (in-game) conditions correspond to one or more machine learning models used for contextual scene enhancement, as well as used by the selected machine learning models to assess intended sensation and select an enhancement effect. For example, the media files 212 and activity files 216 may include indicators of user reactions and references to particular characters, locations, and objects displayed and interacted with in a current gameplay session. Based on such files 212 and 216, therefore, audio analysis server 140 may use such indicators and references to determine which machine learning model may be most relevant for evaluating the current scene, as well as feed the indicators and references into the determined machine learning model(s), thereby being able to better distinguish what the intended sensation of a scene is meant to be. In addition, certain content titles may include characters with backgrounds that may be useful as context in distinguishing an intended sensation of the current scene. An associated scene enhancement may therefore include clipped media (e.g., within an overlay, window on a primary or secondary screen) from or links to the media files 212 and activity files 216. Further, where the analyzed audiovisuals may include certain in-game status of the user or other users, the audio analysis server 140 may use media files 212 and activity files 216 to evaluate and use such in-game status to determine the intended sensation and associated enhancement effect.

Figure 3:
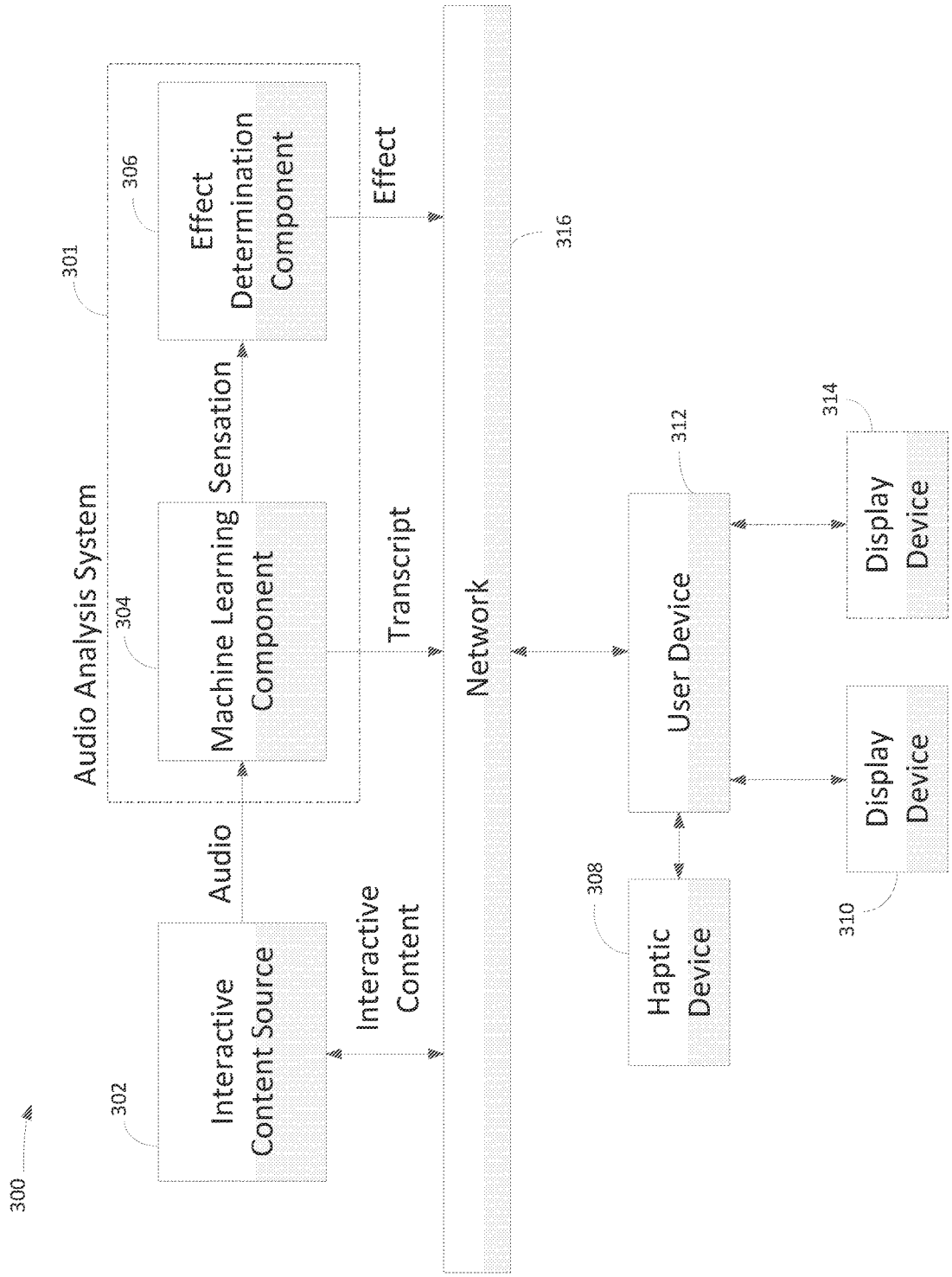
FIG. 3 illustrates an example content generation system including an audio analysis subsystem, in accordance with certain aspects of the present disclosure.

FIG. 3 illustrates an example content generation system 300 including an audio analysis subsystem 301, in accordance with certain aspects of the present disclosure. As shown, the audio analysis subsystem 301 may receive and monitor audio from an interactive content source 302. The interactive content source 302 may correspond to the content source server 110 described with respect to FIG. 1. The interactive content source 302 may communicate and manage interactive content for an experience or game to at least one user device 312. In some aspects, interactive content source 302 may receive an indication, from a user device 312, to pause or replay the interactive content. For example, the content display may provide a link (e.g., on a portion of a display showing the interactive content) that allows the user to pause and replay the interactive content such as a cutscene in a game.

The audio analysis subsystem 301 may include a machine learning component 304 to analyze the audio from the interactive content source 302. In some aspects, the machine learning component may be trained to generate a transcript of speech in the audio. As shown, the transcript may be sent to user devices (e.g., user device 312) via the communication network 316.

In some aspects, the machine learning component 304 may be trained to detect a sensation associated with the audio. For example, audio data labeled with a sensation may be used to train the machine learning component 304 using supervised learning. Once trained, the machine learning component 304 may be used for sensation detection. The sensation may include a mood associated with the audio or a sentiment of speech in the audio. Once the sensation in audio is detected, an indication of the sensation may be provided to an effect determination component 306. The effect determination component 306 may then determine an effect to portray (e.g., indicate) the sensation.

In some cases, the effect may be a visual effect or a haptic effect. For example, in some aspects, the effect determination component 306 may generate enhanced transcripts with customized fonts, size, or colors to indicate the sensation. In some aspects, sound effects in the audio may be translated into haptics to be provided to a haptic device. For instance, the user device 312 may be coupled to a haptic device 308. The haptic device may be part of a headset (e.g., virtual reality headset), a wearable haptic device such as a haptic vest, or in a controller. The haptic effect may result in vibrations of the haptic device 308, indicating a particular sensation associated with the audio. For instance, a particular vibration pattern may indicate suspense that would otherwise be portrayed in the audio. In some aspects, the haptic device 308 may be built into a display device 310, such as into a tablet device or virtual reality (VR) headset.

In some cases, sound effects in the audio may be translated into symbols (e.g., emojis) to be displayed on one or more display devices 310, 314 of the user device 312. For example, a symbol showing anger may be displayed along with subtitles showing a transcript of speech, indicating that the speech has an angry tone. The audio analysis subsystem 301 may use sentiment detection of dialogue audio and sentiment-based markup of subtitles to visually indicate detected sentiment (e.g., angry, shouting, whispering). In this manner, the audio analysis subsystem 301 may visually map mood, music, or sound effects to a visual or haptic effect for a user who can't hear or has difficulty hearing.

In some cases, the audio analysis subsystem 301 may use sentiment analysis to provide ambient displays/effects on certain screen portions or a secondary device (e.g., phone, television, tablet, other smart devices or peripherals), such as providing raining effects or three dimensional (3D) models of clouds to extend and indicate ambience of a virtual environment. For instance, the user device 312 may be coupled to two display devices 310, 314. While the interactive content may be displayed on display device 310, the visual effect may be displayed on display device 314. For example, the display device 314 may display a raining effect to indicate the sound of rain in the audio. In other aspects, the content may be displayed on a first portion of a display, and the effect may be displayed on a second portion of the display. In some aspects, user preferences or device settings may be used to determine which effects are displayed on each display device and/or what portions of the screen are used for the display of each effect. In some cases, the interactive content may be displayed on more than one display device, such as display devices 310, 314. For example, display 310 may display the interactive content unobstructed while display device 314 may display the interactive content with the effects displayed overlayed on top of the interactive content. In another example, the interactive content may be displayed and scaled to fit on a portion of the screen on the display device 314 while the effects are displayed on other portions of the screen.

Figure 4:
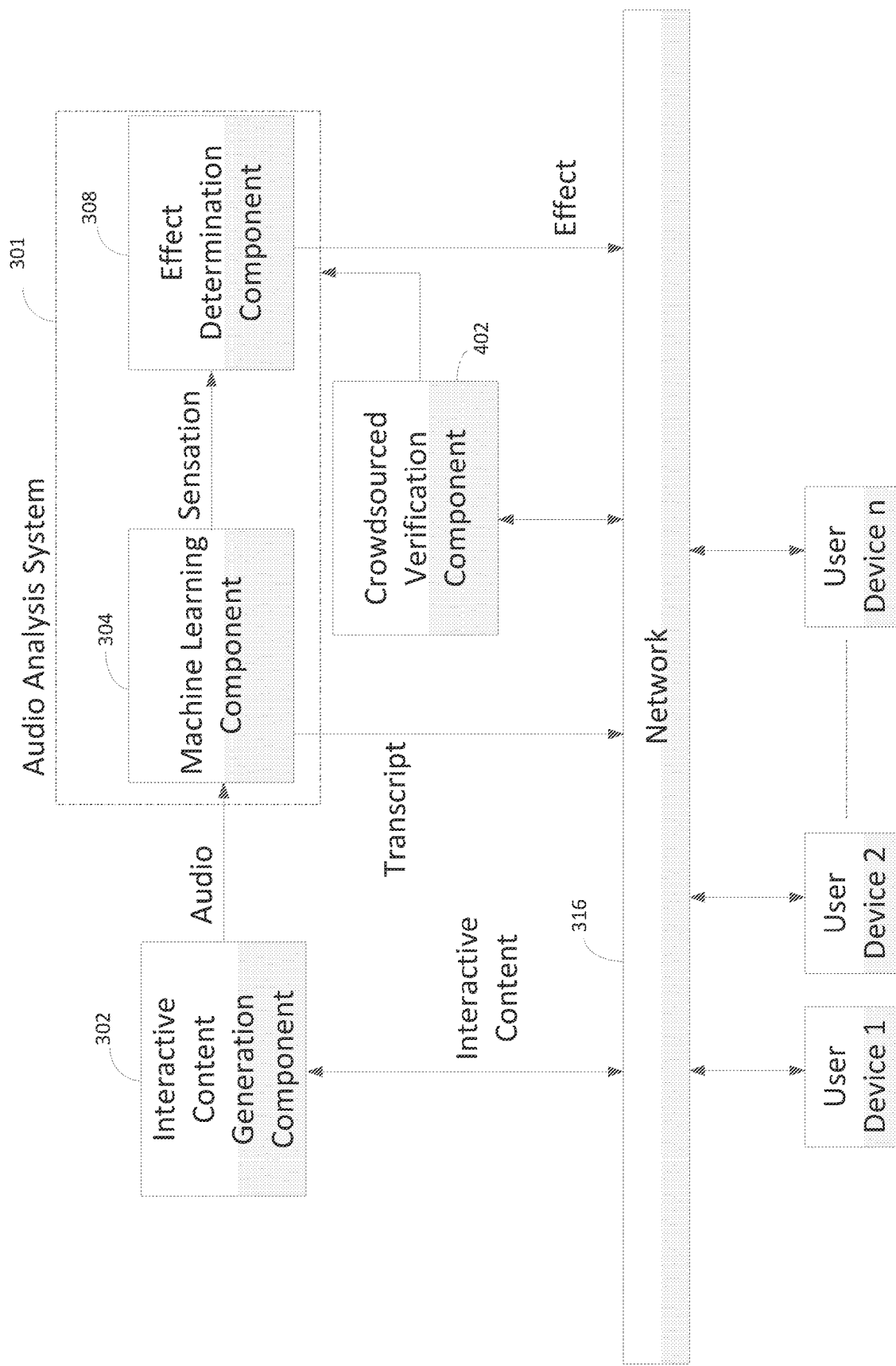
FIG. 4 illustrates an example content generation system having a crowd-sourced verification component, in accordance with certain aspects of the present disclosure.

FIG. 4 illustrates a content generation system 300 having a crowd-sourced verification component 402, in accordance with certain aspects of the present disclosure. As shown, interactive content may be provided to multiple user devices, including user device 1 to user device n, n being any integer greater than 1. Each of the user devices may experience interactive content that may include subtitles and effects indicating a sensation associated with audio, as described herein. In certain aspects of the present disclosure, users of the user devices may be provided with an interface, allowing the users to provide feedback with regards to the transcript or effect. For example, one or more of the user devices may be used to identify an improvement (e.g., error) to the transcript or effect, and indicate the improvement to the crowd-sourced verification component 402 via the communication network 316. The crowd-sourced verification component 402 may determine whether a particular improvement has been identified by a threshold number of user devices. For instance, if more than 100 users identify a particular improvement, then the crowd-sourced verification component 402 may consider the improvement as valid. The crowd-sourced verification component 402 may send an indication of the improvement to the audio analysis subsystem 301, which may reanalyze an associated portion of the audio to generate an updated transcript or effect to be presented during a subsequent interactive session to one or more user devices.

In some aspects, crowd-sourced verification component 402 may coordinate incentives for users to identify improvements to transcripts or effects. For example, for in-game transcripts or effects, an in-game incentive may be provided to users that identify a specific improvement (e.g., error) that results in an updated transcript or effect. The crowd-sourced verification component 402 may determine rewards to provide to one or more user accounts associated with the user devices for submitting the flags, and stores an indication of the determined rewards in association with the user accounts.

Figure 5:
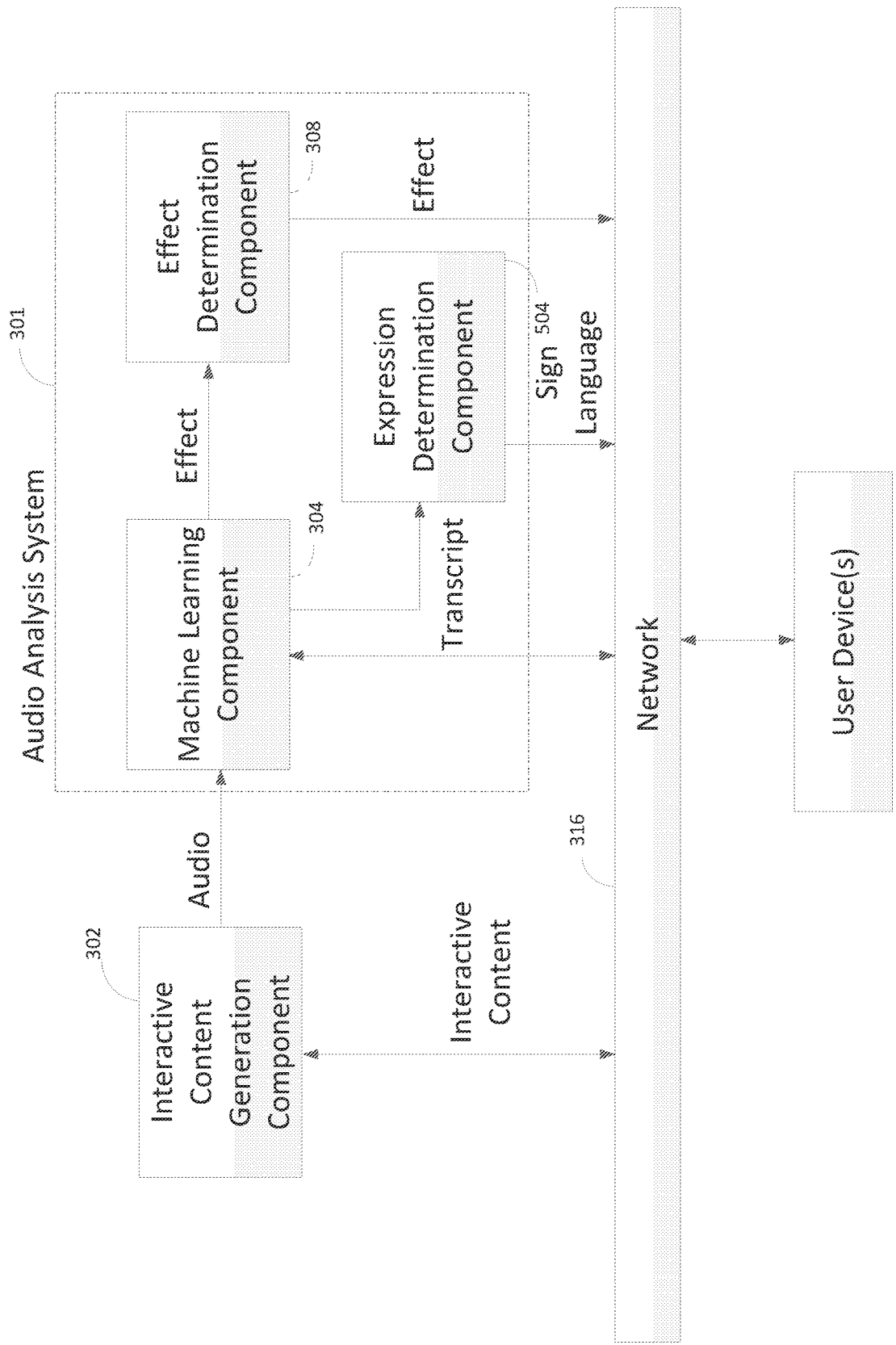
FIG. 5 illustrates an example content generation system having an audio analysis system for generating sign language of a transcript, in accordance with certain aspects of the present disclosure.

FIG. 5 illustrates the content generation system 300 having an audio analysis subsystem 301 for generating sign language of a transcript, in accordance with certain aspects of the present disclosure. As shown, the machine learning component 304 may generate a transcript of speech in the audio. The transcript may be provided to an expression determination component 504. Expression determination component 504 may generate a visual expression of the transcript such as sign language, which may be outputted for display to the user devices 312 via the network, as shown. In some aspects, the expression determination component may be implemented using machine learning to read the transcript and translate the transcript into expressions (e.g., sign language).

In some aspects, audio analysis subsystem 301 and/or crowd-sourced verification component 402 may be implemented as part of a processor (e.g., processor 810) and/or implemented as instructions in storage (e.g., storage device 830). The audio analysis subsystem 301 and/or crowd-sourced verification component 402 may be implemented in hardware, software, or a combination of hardware and software. In some aspects, the audio analysis subsystem 301 and/or crowd-sourced verification component 402 may be implemented by or in the same hardware, software, or combination of hardware and software (e.g., by a same processor). In some aspects, the audio analysis subsystem 301 and/or crowd-sourced verification component 402 may be implemented by or in separate hardware, software, or combination of hardware and software.

Figure 6:
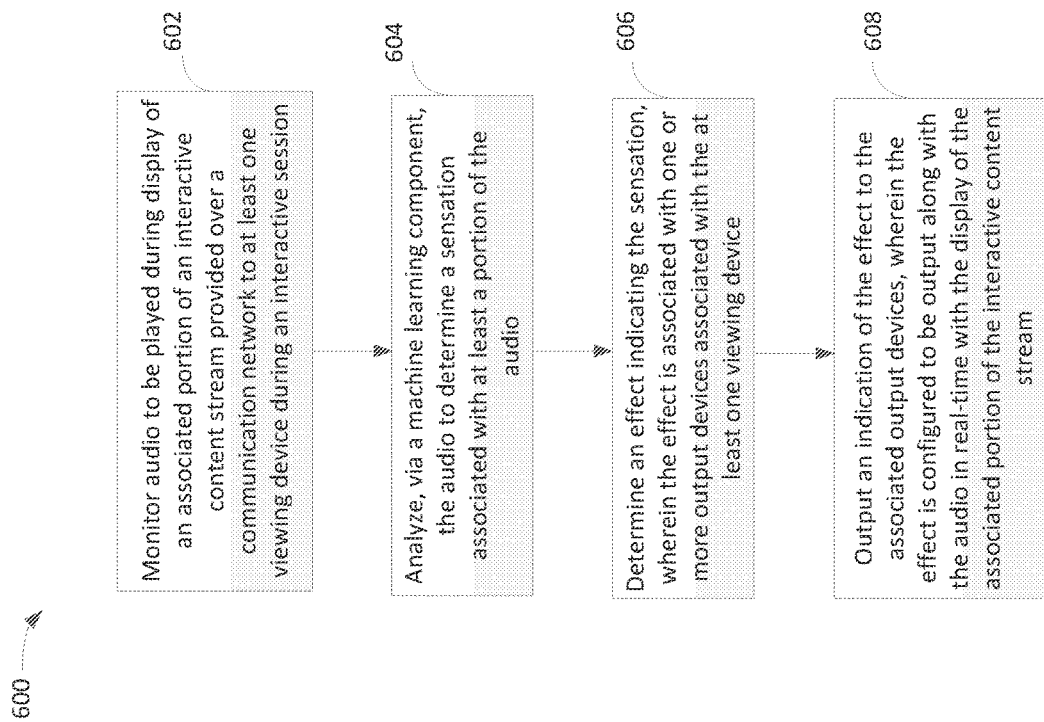
FIG. 6 is a flow diagram illustrating example operations for content display, in accordance with certain aspects of the present disclosure.

FIG. 6 is a flow diagram illustrating example operations 600 for content display. The operations 600 may be performed using a content generation system, such as the content generation system 300.

At block 602, the content generation system may monitor (e.g., audio analysis subsystem 301) audio to be played during display of an associated portion of an interactive content stream provided over a communication network (e.g., network 316) to at least one viewing device (e.g., display device 310) during an interactive session. The interactive content stream may be associated with a gaming title. In some cases, the interactive content stream includes a virtual reality environment.

At block 604, the content generation system analyzes (e.g., via machine learning component 304 of audio analysis subsystem 301) the audio to determine a sensation associated with at least a portion of the audio. Determining the sensation may include identifying a sentiment (e.g., anger or sadness) associated with speech in the audio.

At block 606, the content generation system determines (e.g., effect determination component 306) an effect indicating the sensation. For example, the effect may be associated with one or more output devices (e.g., user device 312) associated with the at least one viewing device. In some aspects, the effect associated with the audio may be a visual effect. The visual effect may include at least one of a specified font, size or color of a displayed transcript of speech in the audio. The visual effect may be a symbol displayed with the audio. The visual effect may be a visual of sign language displayed with the audio. The visual effect may be an animation, such as rain falling, a glass breaking, a dog barking, or an explosion. The effect may be a haptic effect occurring along with playing the audio.

At block 608, the content generation system outputs an indication of the effect to the associated output devices. The effect may be configured to be output along with the audio in real-time with the display of the associated portion of the interactive content stream. In some aspects, the content generation system may generate a display of a transcript corresponding to speech within the audio as the audio is received during the interactive session. The output of the effect may be coordinated with the display of the transcript.

In some aspects, the content generation system may receive (e.g., crowd-sourced verification component 402) flags from one or more user devices (e.g., user device 1 to user device n, described with respect to FIG. 4) associated with updating the effect or a portion of a displayed transcript for the audio. The content generation system may reanalyze (e.g., via the machine learning component 304 of the audio analysis subsystem 301) a corresponding portion of the audio in response to reception of a threshold number of the flags, generate (e.g., via effect determination component 306) an updated effect or transcript based on reanalyzing the corresponding portion of the audio, and output the updated effect or transcript in a subsequent session associated with the interactive content stream. In some cases, the content generation system determines (e.g., via the crowd-sourced verification component 402) rewards to provide to one or more user accounts associated with the user devices for submitting the flags, and stores (e.g., storage device 830) an indication of the determined rewards in association with the user accounts.

In some cases, the interactive content stream is displayed on a first display device (e.g., display device 310) associated the viewing device, and the effect is output on a second display device associated with the viewing device, wherein the second display device is separate from the first display device.

Figure 7:
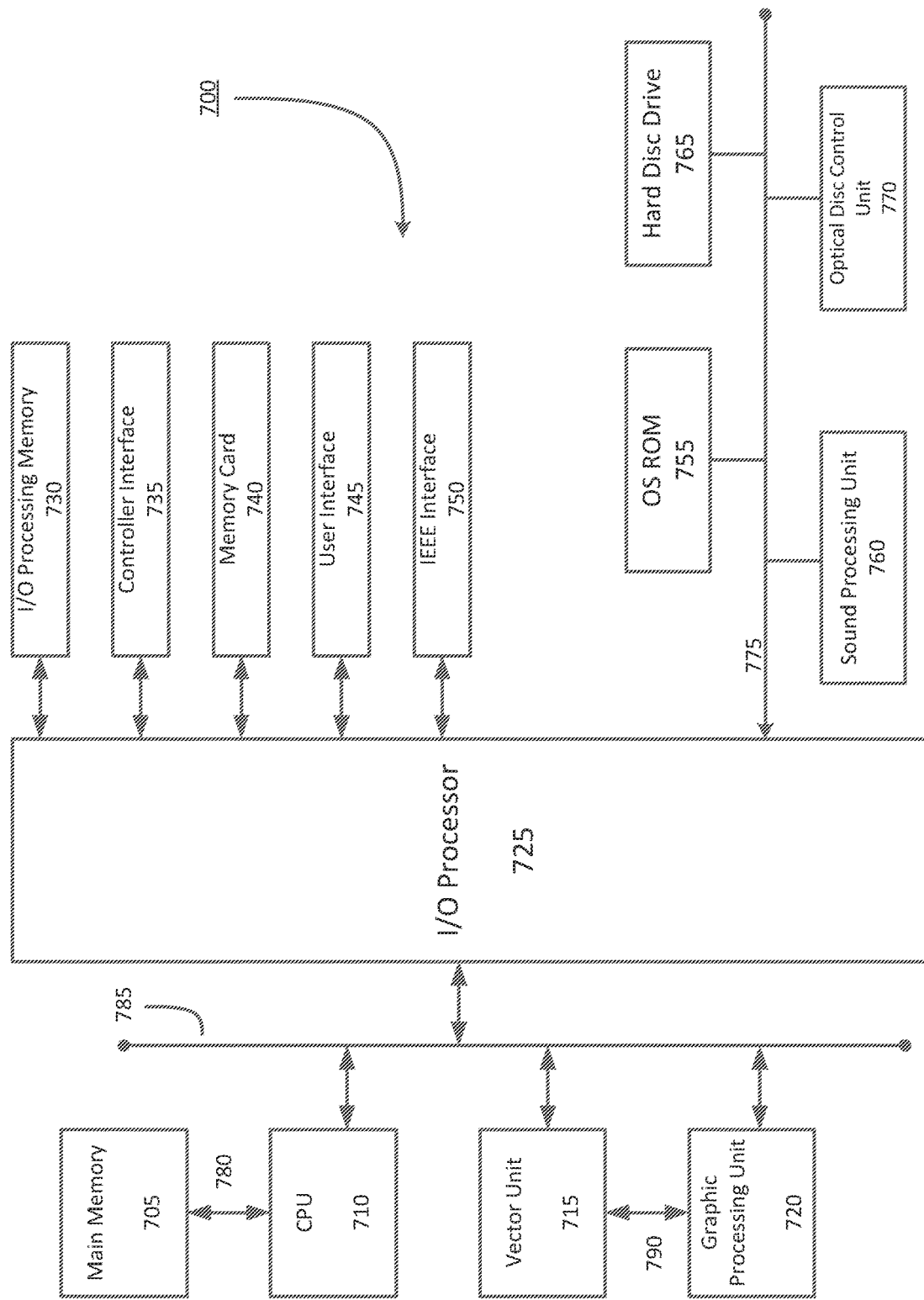
FIG. 7 is a block diagram of an exemplary electronic entertainment system that may be used in aspects of the present disclosure.

FIG. 7 is a block diagram of an exemplary electronic entertainment system 700. The entertainment system 700 of FIG. 7 includes a main memory 705, a central processing unit (CPU) 710, vector unit 715, a graphics processing unit 720, an input/output (I/O) processor 725, an I/O processor memory 730, a controller interface 735, a memory card 740, a Universal Serial Bus (USB) interface 745, and an IEEE interface 750. The entertainment system 700 further includes an operating system read-only memory (OS ROM) 755, a sound processing unit 760, an optical disc control unit 770, and a hard disc drive 765, which are connected via a bus 775 to the I/O processor 725.

Entertainment system 700 may be an electronic game console. Alternatively, the entertainment system 700 may be implemented as a general-purpose computer, a set-top box, a hand-held game device, a tablet computing device, or a mobile computing device or phone. Entertainment systems may contain more or less operating components depending on a particular form factor, purpose, or design.

The CPU 710, the vector unit 715, the graphics processing unit 720, and the I/O processor 725 of FIG. 7 communicate via a system bus 785. Further, the CPU 710 of FIG. 7 communicates with the main memory 705 via a dedicated bus 780, while the vector unit 715 and the graphics processing unit 720 may communicate through a dedicated bus 790. The CPU 710 of FIG. 7 executes programs stored in the OS ROM 755 and the main memory 705. The main memory 705 of FIG. 7 may contain pre-stored programs and programs transferred through the I/O Processor 725 from a CD-ROM, DVD-ROM, or other optical disc (not shown) using the optical disc control unit 770. I/O Processor 725 of FIG. 7 may also allow for the introduction of content transferred over a wireless or other communications network (e.g., 4$, LTE, 3G, and so forth). The I/O processor 725 of FIG. 7 primarily controls data exchanges between the various devices of the entertainment system 700 including the CPU 710, the vector unit 715, the graphics processing unit 720, and the controller interface 735.

The graphics processing unit 720 of FIG. 7 executes graphics instructions received from the CPU 710 and the vector unit 715 to produce images for display on a display device (not shown). For example, the vector unit 715 of FIG. 7 may transform objects from three-dimensional coordinates to two-dimensional coordinates, and send the two-dimensional coordinates to the graphics processing unit 720. Furthermore, the sound processing unit 760 executes instructions to produce sound signals that are outputted to an audio device such as speakers (not shown). Other devices may be connected to the entertainment system 700 via the USB interface 745, and the IEEE 1394 interface 750 such as wireless transceivers, which may also be embedded in the system 700 or as a part of some other component such as a processor.

A user of the entertainment system 700 of FIG. 7 provides instructions via the controller interface 735 to the CPU 710. For example, the user may instruct the CPU 710 to store certain game information on the memory card 740 or other non-transitory computer-readable storage media or instruct a character in a game to perform some specified action.

Figure 8:
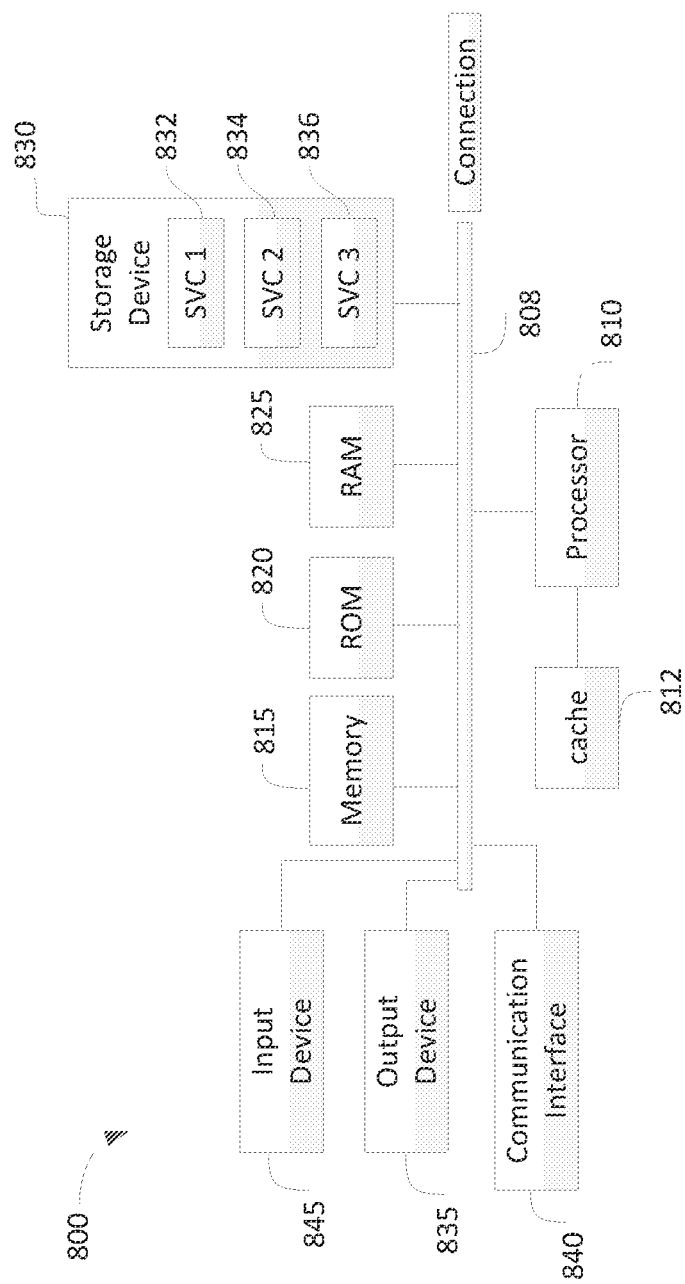
FIG. 8 is a block diagram of an exemplary computing device that may be used to implement an embodiment of the present invention

FIG. 8 illustrates an architecture of a computing system 800 wherein the components of the system 800 are in electrical communication with each other using a connection 808, such as a bus. Exemplary system 800 includes a processing unit (CPU or processor) 810 and a system connection 808 that couples various system components including the system memory 815, such as read only memory (ROM) 820 and random access memory (RAM) 828, to the processor 810. The system 800 can include a cache of high-speed memory connected directly with, in close proximity to, or integrated as part of the processor 810. The system 800 can copy data from the memory 815 and/or the storage device 830 to the cache 812 for quick access by the processor 810. In this way, the cache can provide a performance boost that avoids processor 810 delays while waiting for data. These and other modules can control or be configured to control the processor 810 to perform various actions. Other system memory 815 may be available for use as well. The memory 815 can include multiple different types of memory with different performance characteristics. The processor 810 can include any general purpose processor and a hardware or software service, such as service 1 832, service 2 834, and service 3 836 stored in storage device 830, configured to control the processor 810 as well as a special-purpose processor where software instructions are incorporated into the actual processor design. The processor 810 may be a completely self-contained computing system, containing multiple cores or processors, a bus, memory controller, cache, etc. A multi-core processor may be symmetric or asymmetric.

To enable client interaction with the computing system 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art. In some instances, multimodal systems can enable a client to provide multiple types of input to communicate with the computing system 800. The communications interface 840 can generally govern and manage the client input and system output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof.

The present invention may be implemented in an application that may be operable by a variety of end user devices. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different manufacturer. The present methodologies described herein are fully intended to be operable on a variety of devices. The present invention may also be implemented with cross-title neutrality wherein an embodiment of the present system may be utilized across a variety of titles from various publishers.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for enhancing content display, the method comprising:
   monitoring audio to be played during display of an associated portion of an interactive content stream provided over a communication network to a viewing device during an interactive session;
   analyzing the audio of the interactive content stream using a machine learning model trained to identify a sensation associated with audio content, wherein the audio of the interactive content stream is determined to be associated with an identified sensation;

determining an effect for the identified sensation, wherein the effect is associated with instructions for one or more output devices associated with the viewing device, and wherein the instructions are executable by the viewing device to output the effect via the output devices in coordination with the audio and in real-time with the display of the associated portion of the interactive content stream;

reanalyzing the audio of the associated portion of the interactive content stream based on one or more flags from one or more user devices; and updating the instructions based on the reanalyzed audio, wherein the updated instructions are associated with an updated effect corresponding to an improvement of the effect, and wherein the updated instructions are executable to present the updated effect during the associated portion of the interactive content stream.

2. The method of claim 1, wherein the sensation includes a sentiment associated with speech in the audio.

3. The method of claim 1, wherein the effect includes a visual effect.

4. The method of claim 3, wherein the visual effect includes at least one of a specified font, size, or color of a displayed transcript of speech in the audio.

5. The method of claim 3, wherein the visual effect includes a symbol displayed with the audio.

6. The method of claim 3, wherein the visual effect includes a visual of sign language displayed with the audio.

7. The method of claim 1, wherein the effect includes a haptic effect actuated in coordination with outputted audio.

8. The method of claim 1, further comprising:
determining a reward to provide to one or more user accounts associated with the user devices for submitting the flags; and
storing an indication of the determined reward in association with the user accounts.

9. The method of claim 1, wherein the interactive content stream is displayed on a first display device associated with the viewing device, and wherein the output devices include a second display device that is associated with the viewing device and separate from the first display device.

10. The method of claim 1, wherein the interactive content stream is associated with a gaming title.

11. The method of claim 1, wherein the interactive content stream comprises a virtual reality environment.

12. The method of claim 1, further comprising generating a display of a transcript corresponding to speech within the audio as the audio is received during the interactive session, wherein the output of the effect is coordinated with the display of the transcript.

13. An apparatus for enhancing content display, the apparatus comprising:
a communication interface associated with a communication network, wherein the communication interface monitors audio to be played during display of an associated portion of an interactive content stream provided over a communication network to a viewing device during an interactive session; and
one or more processors that execute instructions stored in memory, wherein the processors execute the instructions to:
analyze the audio of the interactive content stream using a machine model trained to identify a sensation associated with audio content, wherein the audio of the interactive content stream is determined to be associated with an identified sensation;
determine an effect for the sensation, wherein the effect is associated with instructions for one or more output devices associated with the viewing device, and wherein the instructions are executable by the viewing device to output the effect via the output devices in coordination with the audio and in real-time with the display of the associated portion of the interactive content stream;
reanalyze the audio of the associated portion of the interactive content stream based on one or more flags from one or more user devices; and
update the instructions based on the reanalyzed audio, wherein the updated instructions are associated with an updated effect corresponding to an improvement of the effect, and wherein the updated instructions are executable to present the updated effect during the associated portion of the interactive content stream.

14. The apparatus of claim 13, wherein the sensation includes a sentiment associated with speech in the audio.

15. The apparatus of claim 13, wherein the effect includes a visual effect.

16. The apparatus of claim 15, wherein the visual effect includes at least one of a specified font, size, or color of a displayed transcript of speech in the audio.

17. The apparatus of claim 15, wherein the visual effect includes a symbol displayed with the audio.

18. The apparatus of claim 15, wherein the visual effect includes a visual of sign language displayed with the audio.

19. A non-transitory computer-readable storage medium having instructions stored thereon, the instructions executable by one or more processors, to perform a method for enhancing content display, the method comprising:
monitoring audio to be played during display of an associated portion of an interactive content stream provided over a communication network to a viewing device during an interactive session;
analyzing the audio of the interactive content stream using a machine learning model trained to identify a sensation associated with audio content, wherein the audio of the interactive content stream is determined to be associated with an identified sensation;
determining an effect for the identified sensation, wherein the effect is associated with instructions for one or more output devices associated with the viewing device, and wherein the instructions are executable by the viewing device to output the effect via the output devices in coordination with the audio and in real-time with the display of the associated portion of the interactive content stream;
reanalyzing the audio of the associated portion of the interactive content stream based on one or more flags from one or more user devices; and
updating the instructions based on the reanalyzed audio, wherein the updated instructions are associated with an updated effect corresponding to an improvement of the effect, and wherein the updated instructions are executable to present the updated effect during the associated portion of the interactive content stream.

* * * * *